United States Patent
Stafford et al.

(10) Patent No.: US 11,213,816 B2
(45) Date of Patent: Jan. 4, 2022

(54) METHOD FOR FABRICATING AN APPARATUS COMPRISING AT LEAST ONE MICROFLUIDIC CHANNEL AND AN APPARATUS COMPRISING A MICROFLUIDIC CHANNEL

(71) Applicant: Nokia Technologies Oy, Espoo (FI)

(72) Inventors: Jason Stafford, Birmingham (GB); Paul King, Dublin (IR); Graeme Cunningham, Dublin (IR)

(73) Assignee: Nokia Technologies Oy, Espoo (FI)

( * ) Notice: Subject to any disclaimer, the term of this patent is extended or adjusted under 35 U.S.C. 154(b) by 270 days.

(21) Appl. No.: 16/479,463

(22) PCT Filed: Jan. 22, 2018

(86) PCT No.: PCT/EP2018/051489
§ 371 (c)(1),
(2) Date: Jul. 19, 2019

(87) PCT Pub. No.: WO2018/134420
PCT Pub. Date: Jul. 26, 2018

(65) Prior Publication Data
US 2019/0374942 A1    Dec. 12, 2019

(30) Foreign Application Priority Data

Jan. 20, 2017   (EP) .................................... 17152375

(51) Int. Cl.
*B01L 3/00* (2006.01)
*G01N 27/07* (2006.01)
*G01N 27/08* (2006.01)

(52) U.S. Cl.
CPC ........ *B01L 3/502707* (2013.01); *G01N 27/07* (2013.01); *G01N 27/08* (2013.01); *B01L 2300/0645* (2013.01); *B01L 2300/12* (2013.01); *B01L 2300/168* (2013.01); *B01L 2300/1805* (2013.01); *B01L 2400/0415* (2013.01)

(58) Field of Classification Search
CPC ....... B01L 3/502707; B01L 2300/0645; B01L 3/5027; B01L 3/00; G01N 27/07; G01N 27/08
See application file for complete search history.

(56) References Cited

U.S. PATENT DOCUMENTS 7,448,441 B2    11/2008  Hendricks et al.
2009/0038832 A1  2/2009  Chaffins et al.
(Continued)

OTHER PUBLICATIONS

Office action received for corresponding European Patent Application No. 17152375.6, dated Aug. 6, 2020, 4 pages.
(Continued)

*Primary Examiner* — Brian J. Sines
(74) *Attorney, Agent, or Firm* — Harrington & Smith

(57) ABSTRACT

A method for fabricating an apparatus comprising at least one microfluidic channel within an anisotropic composite material structure comprising multiple electrically and thermally conductive pathways, the method comprising providing an electrode within a composite material, the electrode positioned in a desired location for a microfluidic channel applying an electric field across at least a portion of the composite material using the electrode whereby to define the pathways and curing the composite material whereby to fix the pathways in position in the composite material.

10 Claims, 10 Drawing Sheets

(56) References Cited

U.S. PATENT DOCUMENTS

2010/0032141 A1 2/2010 Heydari et al.
2012/0090816 A1 4/2012 Bayazitoglu et al.

OTHER PUBLICATIONS

Extended European Search Report received for corresponding European Patent Application No. 17152375.6, dated Aug. 31, 2017, 9 pages.
Martin et al., "Electric Field-Induced Aligned Multi-Wall Carbon Nanotube Networks in Epoxy Composites", Polymer, vol. 46, No. 3, Jan. 26, 2005, pp. 877-886.
Goh et al., "Directional Alignment of Carbon Nanotubes in Polymer Matrices: Contemporary Approaches and Future Advances", Composites Part A: Applied Science and Manufacturing, vol. 56, Jan. 2014, pp. 103-126.
Aviles et al., "Electrical and Piezoresistive Properties of Multi-Walled Carbon Nanotube/Polymer Composite Films Aligned by an Electric Field", Carbon, vol. 49, No. 9, Aug. 2011, pp. 2989-2997.
Sun et al., "An Array of Interdigitated Parallel Wire Electrodes for Preparing a Large-Scale Nanocomposite Film with Aligned Carbon Nanotubes", Journal of Physics D: Applied Physics, vol. 44, No. 44, Oct. 18, 2011, 5 pages.
International Search Report and Written Opinion received for corresponding Patent Cooperation Treaty Application No. PCT/EP2018/051489, dated Feb. 14, 2018, 12 pages.
Office action received for corresponding European Patent Application No. 17152375.6, dated May 31, 2019, 4 pages.

METHOD FOR FABRICATING AN APPARATUS COMPRISING AT LEAST ONE MICROFLUIDIC CHANNEL AND AN APPARATUS COMPRISING A MICROFLUIDIC CHANNEL

RELATED APPLICATION

This application was originally filed as Patent Cooperation Treaty Application No. PCT/EP2018/051489 filed Jan. 22, 2018 which claims priority benefit to European Patent Application No. 17152375.6, filed Jan. 20, 2017.

TECHNICAL FIELD

Aspects relate, in general, to a method for fabricating an apparatus comprising at least one microfluidic channel and an apparatus comprising a microfluidic channel.

BACKGROUND

Microfluidics is a discipline that enables gaseous and fluid materials to be controlled and manipulated at the sub-millimetre scale in order to enable such materials to be moved, mixed, separated or otherwise processed for numerous different applications such as biological and chemical analysis and thermal management.

Polydimethylsiloxane (PDMS) can be used in the fabrication of microfluidic devices. This approach is shown in FIG. 1. A photomask 100 can be created with the desired microchannel footprint and a photoresist 101 is spin-coated onto a silicon wafer 103, and cured 105 through the photomask, leaving a mould 107 of the microchannel. PDMS 109 can then be poured onto the mould, thermally cured over a number of hours and then removed from the mould. In order to seal the device, the PDMS can be bonded to a glass substrate to leave the final microfluidic device. This is a common feature in microfluidic devices, where three of the four channel surfaces are PDMS and the fourth is a dissimilar material (e.g. glass substrate). This difference in material can result in dissimilar fluid contact angles around the perimeter of the channel and as a result another processing step may be required to provide homogenous surface characteristics. The lower part of FIG. 1 shows fabrication of a device 111 which does not have any active functionality (i.e. it only creates the liquid streams for fluid transport) using this process.

To create functional microfluidic devices that can perform the various analyses listed above, there can be additional process steps. These steps 201a-g are shown in FIG. 2 for a silicon device 200. Specifically, steps 201a-c relate to the fabrication of portion 200b of device 200, and steps 201d-g relate to the fabrication of portion 200a of device 200. As can be seen, the resulting channel cross-section is rectangular and contains sharp corners which can damage biological samples that, in their natural environment, flow along circular capillaries/veins/arteries. Other silicon etching methods also suffer from the same limitations in channel cross-sectional geometry. The addition of active measurement and control functionality such as pH, concentration, phase, mass flow, reaction kinetics requires additional processing steps to include electrodes for electrical connections.

Accordingly, creation of functional microfluidic devices requires a large number of steps. The resultant apparatus can have a complex layout of different materials for sensing and/or control, and may possess channel cross-sections which are not the natural shape in biological systems. The equipment needed is specialised and expensive. Therefore it is not accessible to the broader public community.

SUMMARY

According to an example, there is provided a method for fabricating an apparatus comprising at least one microfluidic channel within an anisotropic composite material structure comprising multiple electrically and thermally conductive pathways, the method comprising providing an electrode within a composite material, the electrode positioned in a desired location for a microfluidic channel, applying an electric field across at least a portion of the composite material using the electrode whereby to define the pathways and curing the composite material whereby to fix the pathways in position in the composite material. The method can further include removing the electrode from the cured composite material. The method can further include depositing the electrode in the desired location on a support structure and depositing the composite material over the electrode. The method can further include providing or otherwise depositing an upper layer over at least a portion of the composite material that has been deposited over the electrode. At least one of the support structure and upper layer can include a conductive portion on a surface thereof, and the method can further comprise applying the electric field across at least a portion of the composite material using the electrode and the conductive portion. The support structure and upper layer can include respective conductive portions on a surface thereof and the method can further comprise applying the electric field across at least a portion of the composite material using the electrode and the conductive portions. The electrode can be removed mechanically, by melting or by being dissolved.

According to an example, there is provided an apparatus comprising a microfluidic channel within an anisotropic composite material structure, the anisotropic composite material structure comprising multiple pre-aligned electrically and thermally conductive pathways extending between the microfluidic channel and respective conductive surfaces at the periphery of the anisotropic composite material structure. The anisotropic composite material structure can be provided within or sandwiched between UV transmissive walls. The UV transmissive walls can include respective conductive portions on a surface thereof. Multiple electrodes within the anisotropic composite material structure can be provided and arranged to enable a potential difference to be applied across the microfluidic channel. The multiple electrodes can be provided on either side of and run generally parallel to and in the same plane as the microfluidic channel and can be so profiled as to define a constriction or gate through which the microfluidic channel passes whereby to provide a focused conductive region. The anisotropic composite material structure can comprise a polymer-nanotube mixture, such as a carbon nanotube mixture. The electrically and thermally conductive pathways extending between the microfluidic channel and respective conductive surfaces at the periphery of the anisotropic composite material structure can be defined by pre-aligned carbon nanotubes. That is, the alignment of some carbon nanotubes as a result of the application of the electric field and curing of the composite can result in regions of relatively higher thermal and electrical conductance compared to regions of the cured composite in which the nanotubes are not generally aligned such that their long axes are not arranged along a pathway but are more randomly oriented.

BRIEF DESCRIPTION OF THE DRAWINGS

Embodiments will now be described, by way of example only, with reference to the accompanying drawings, in which.

DESCRIPTION

Figure 1:
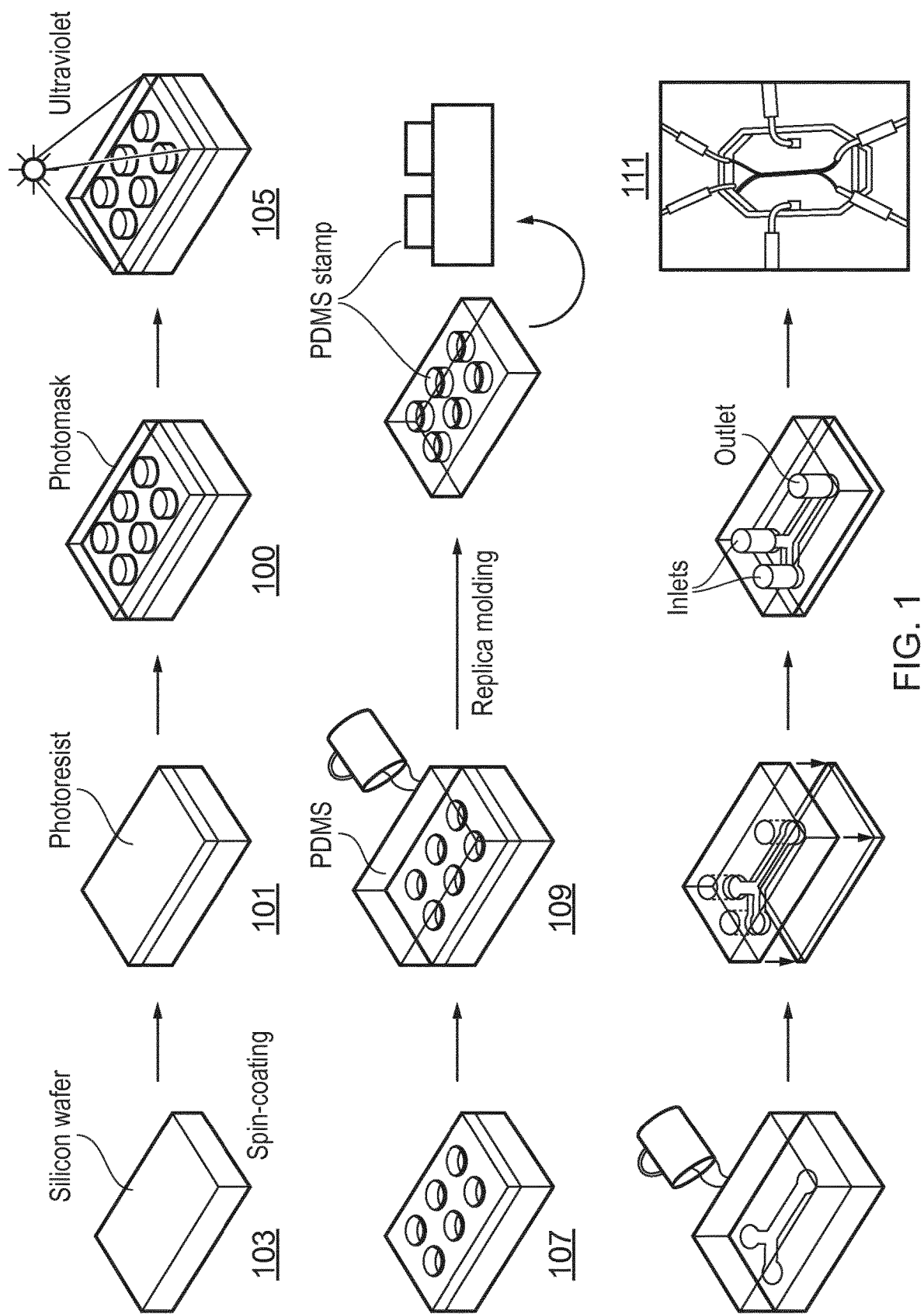
FIG. 1 is a schematic representation of a prior art method of fabrication of a microfluidic apparatus stamp.
Figure 2:
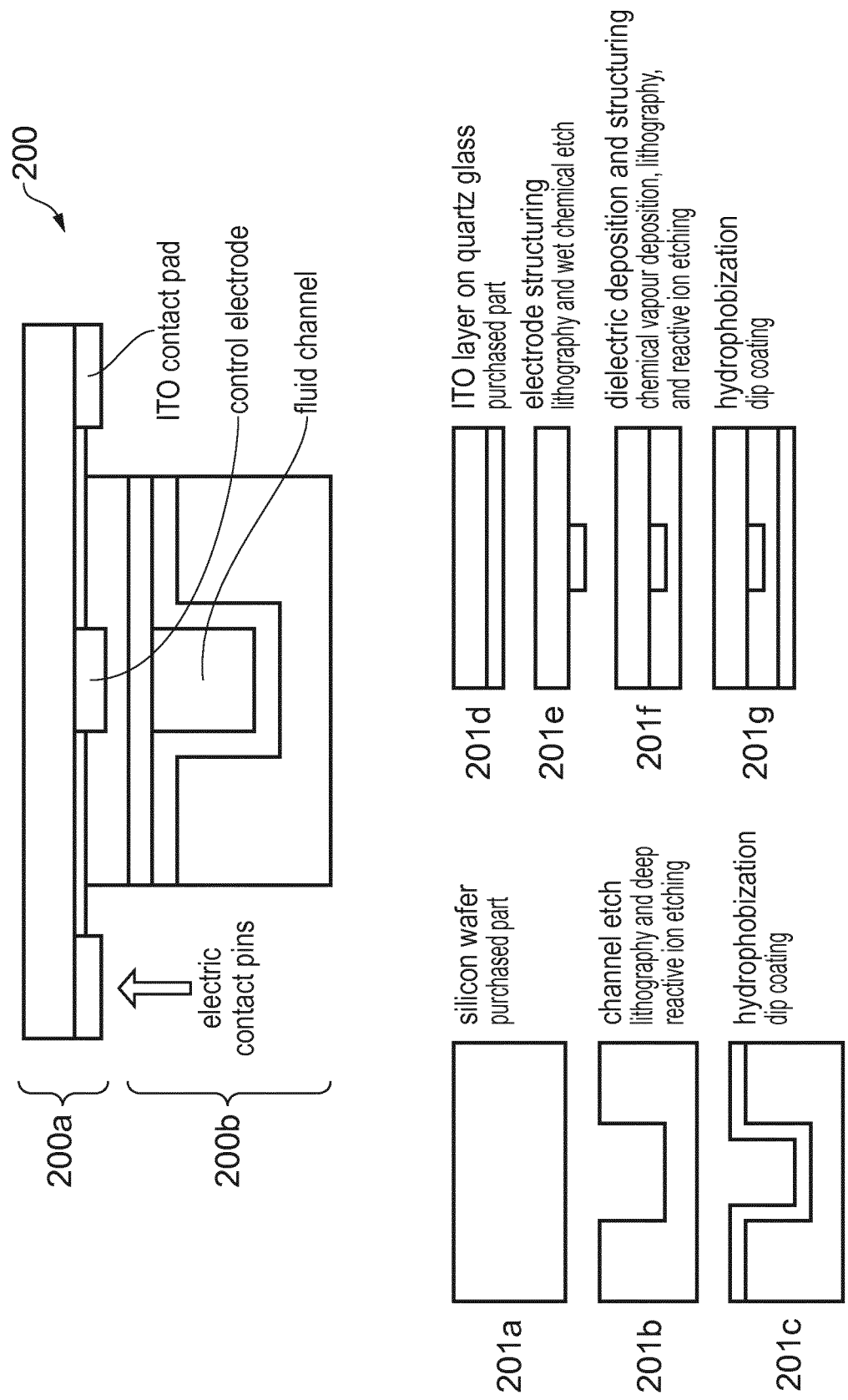
FIG. 2 is a schematic representation of the process steps in a prior art process for fabrication of a microfluidic apparatus.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

As noted above, biological and chemical analysis technologies can utilise microfluidics to transport samples for characterisation and chemical reaction. Microfluidics can also be used in thermal management. For example, microfluidics can be used to transfer heat away from equipment. Such thermal management technologies can depend on high thermal conductivity metals to ensure that the resistance to heat flow is kept low. However, thermally conductive plastics are emerging as an alternative in some low weight applications (i.e. aerospace, and for wireless products that require manual mounting on masts/roofs). These plastics are usually isotropic composites (a mixture of a low conductivity polymer with a high conductivity filler material) and the final shapes are formed through standard processes such as injection moulding. Current materials require high filler loadings (>20%) to improve thermal performance and their isotropic material distribution can have adverse effects on other properties such as mechanical strength, electrical conductivity etc. There is also no capability to control anisotropic thermal/electrical conductive paths within the polymer and the materials are currently constricted to moulding processes and have not been applied to additive manufacturing photopolymers (such as 3D printing, stereolithography) where unrestricted design complexity can be achieved.

According to an example, there is provided a polymer which contains fluidic channels that liquids/gases can flow through and which has fully customisable anisotropic properties. Both the fabrication of the microfluidic channels and the property customisation are carried out in the one fabrication process.

Figure 3:
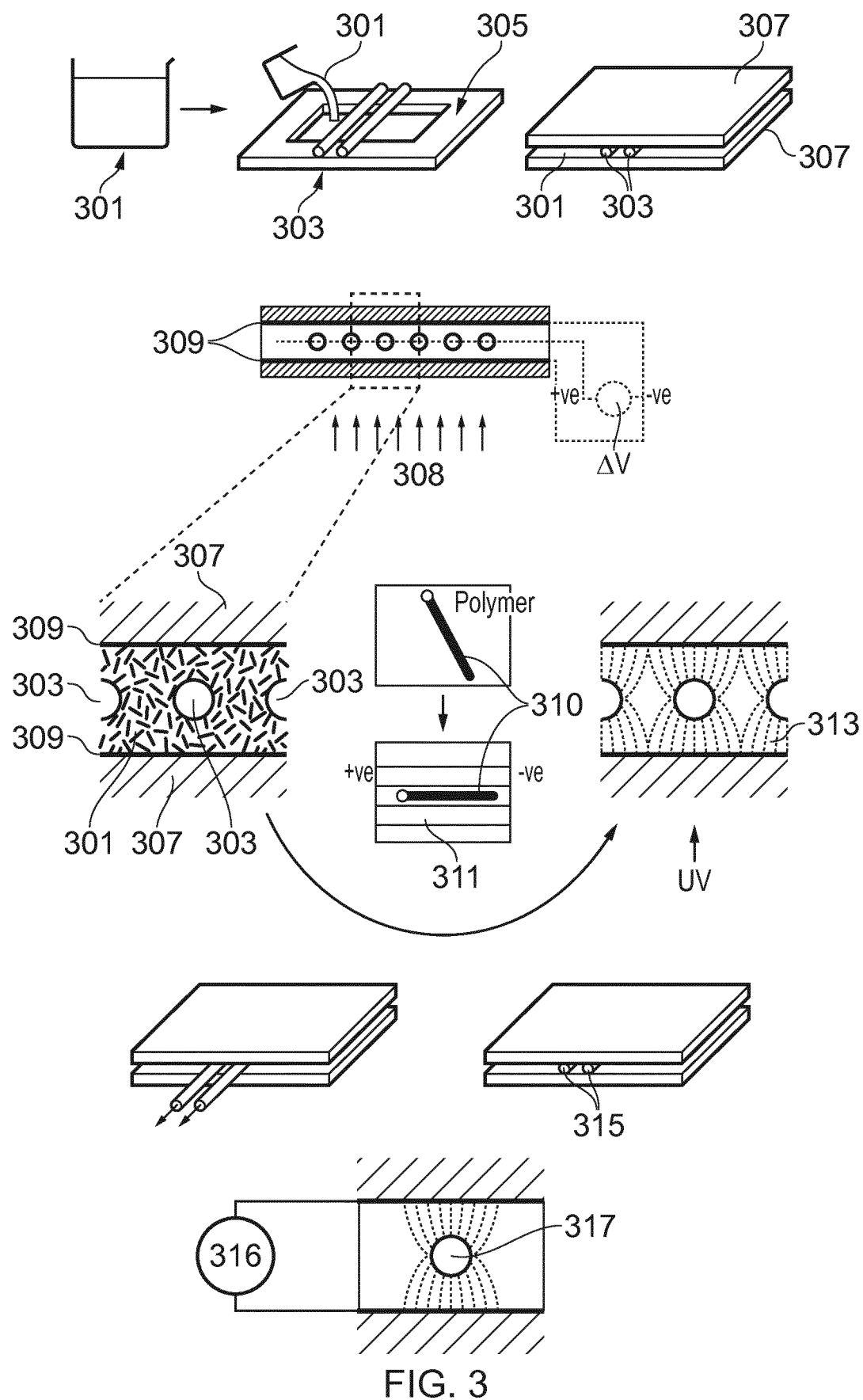
FIG. 3 is a schematic representation of a method for fabricating an apparatus comprising at least one microfluidic channel within an anisotropic composite material structure according to an example.

FIG. 3 is a schematic representation of a method for fabricating an apparatus comprising at least one microfluidic channel within an anisotropic composite material structure according to an example. The anisotropic composite material structure comprises multiple electrically and thermally conductive pathways. In an example, these pathways, which may not be continuous but rather defined by intermittent paths of material, can be formed using a low percentage weight of nanotubes dispersed in a liquid polymer 301. A percentage (by weight) of carbon nanotubes, for example, can be from about 5-10%. Electrically conductive wire(s) 303 are positioned in desired locations where a final microchannel or microchannel array will exist. FIG. 3 depicts two such electrodes 303 but more or less may be used and they may take different routes and have different profiles to those shown. In an example, circular, solid core, 250 micron diameter, silver plated oxygen free copper wire has been proven to work successfully. However, it is envisaged that various other electrically conductive solid core wires could be used to get the desired channel diameter and cross-sectional shape.

According to an example, the polymer composite is transferred into a mould/tank 305. In the example of FIG. 3 this is between two quartz glass slides that are ITO coated on one face 309 to provide a conductive portion on a surface thereof. A slide on which an electrode is provided can thus be in the form of a support structure, supporting an electrode ready for deposition of composite material. The use of a UV transmissive substrate is to allow UV light transmission 308 for photopolymer curing. Thus, electrodes 303 are provided within the composite material 301 and are positioned in a desired location for a microfluidic channel between glass slides 307.

An electric field is applied across at least a portion of the composite material 301 using at least one of the electrodes 303 whereby to define the pathways mentioned above. That is, an electric field is generated within the polymer 301. In an example, the ITO surfaces 309 and microscale wires 303 as thus used as electrodes. The electric field causes the nanotubes 310 in the composite material 301 to align along the field lines 311 due to their polarisability combined with electrophoresis effects. This creates custom high electrical (and thermal) conductivity paths 313 within the polymer carrier material. A considerable reduction in electrical resistance by $1/1000$ has been observed in test devices built in the lab. Accordingly, an electric field applied across at least a portion of the composite material using the electrode can be used to define the pathways.

While maintaining the electric field, the polymer is cured (either UV or thermally for example) to create a permanent solid structure. Thus, the pathways are fixed in position in the composite material.

In an example, the electrodes 303 can be mechanically removed (e.g. pulled) from the polymer post-curing. The voids 315 left behind in the polymer are the microchannels through which fluid (or gaseous) can be transported. High quality circular channels are shown in FIG. 3. One alternate option is to use a low melt alloy wire which could be removed at below the polymer glass transition temperature using heating. Another option is to dissolve the wire using an acid to erode the wire material but leave the resistive polymer undamaged.

Thus, it is possible to monitor and/or control different phases, concentrations, reaction kinetics and so on that flow through a microfluidic channel 317 using resistance or capacitance 316 measurements for example.

If active monitoring or control is needed, the electrodes used to apply the electric field could also be used to measure resistance/capacitance across the fluidic channel. That is, some electrodes may not be removed in order to provide means to provide measurements relating to certain characteristics of a material flowing through a channel.

Figure 4:
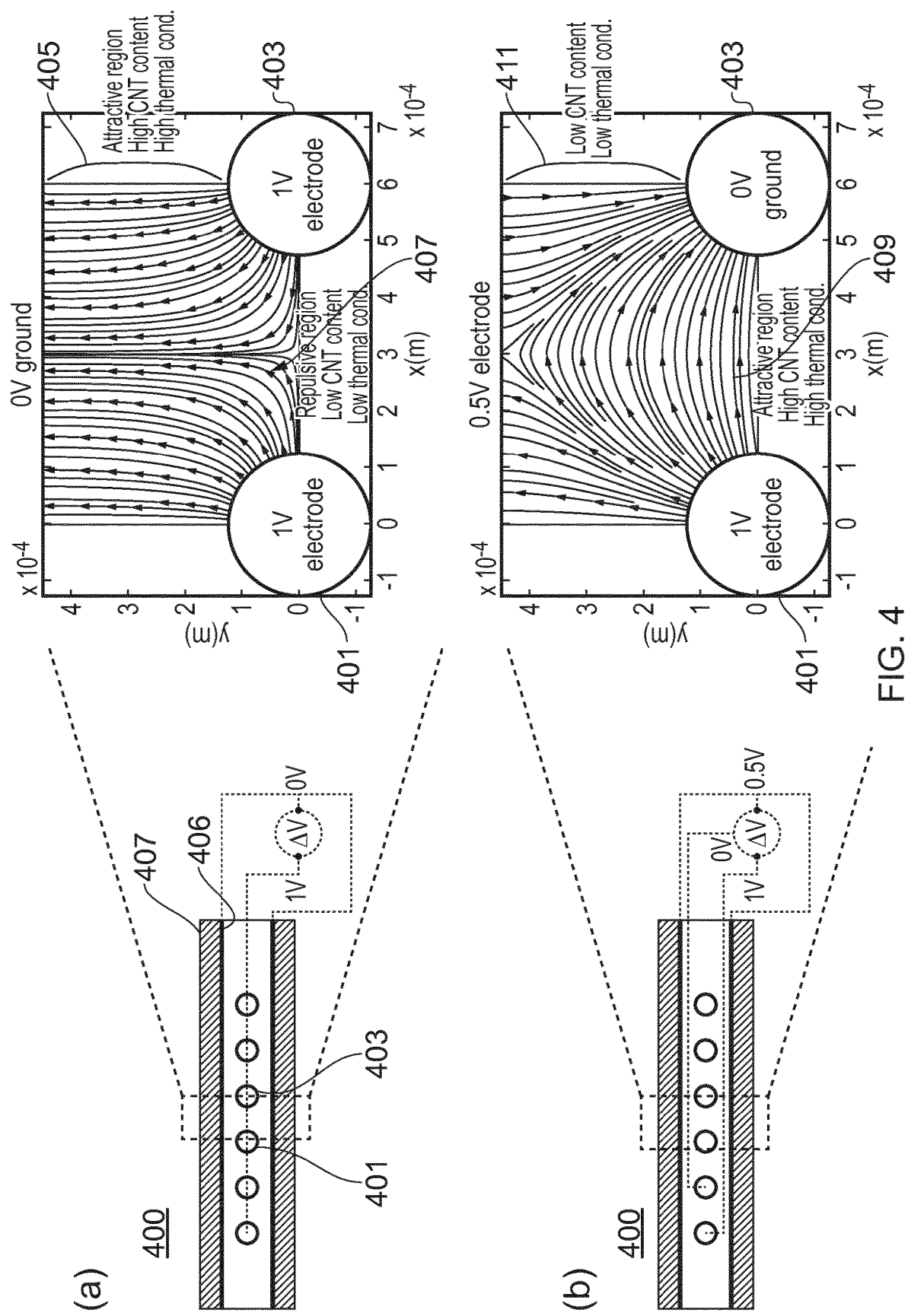
FIGS. 4a and 4b are schematic representations of various voltage arrangements used to generate electric fields to define pathways according to an example.

FIG. 4 is a schematic representation of various voltage arrangements used to generate electric fields to define pathways according to an example. More particularly, FIG. 4 depicts electric field lines for two different voltage potentials used to generate customised low/high conductivity regions between adjacent circular electrodes 401, 403 in an apparatus 400. As can be seen in FIG. 4a, when 1V is passed through two electrodes 401, 403, as shown, the resultant electric field provides a high attractive region with a high carbon nanotube concentration and high thermal/electrical conductivity, along with a repulsive region 407 with low carbon nanotube concentration and low thermal/electrical conductivity.

FIG. 4b shows an alternative configuration in which 1V is applied to electrode 401, with 0V at electrode 403 and 0.5V (versus 0V in FIG. 4a) at a conductive portion or layer 406 on the slide 407. The resultant electric field provides a high attractive region 409 with a high carbon nanotube concentration and high thermal/electrical conductivity, along with a repulsive region 411 with low carbon nanotube concentration and low thermal/electrical conductivity.

Figure 5:
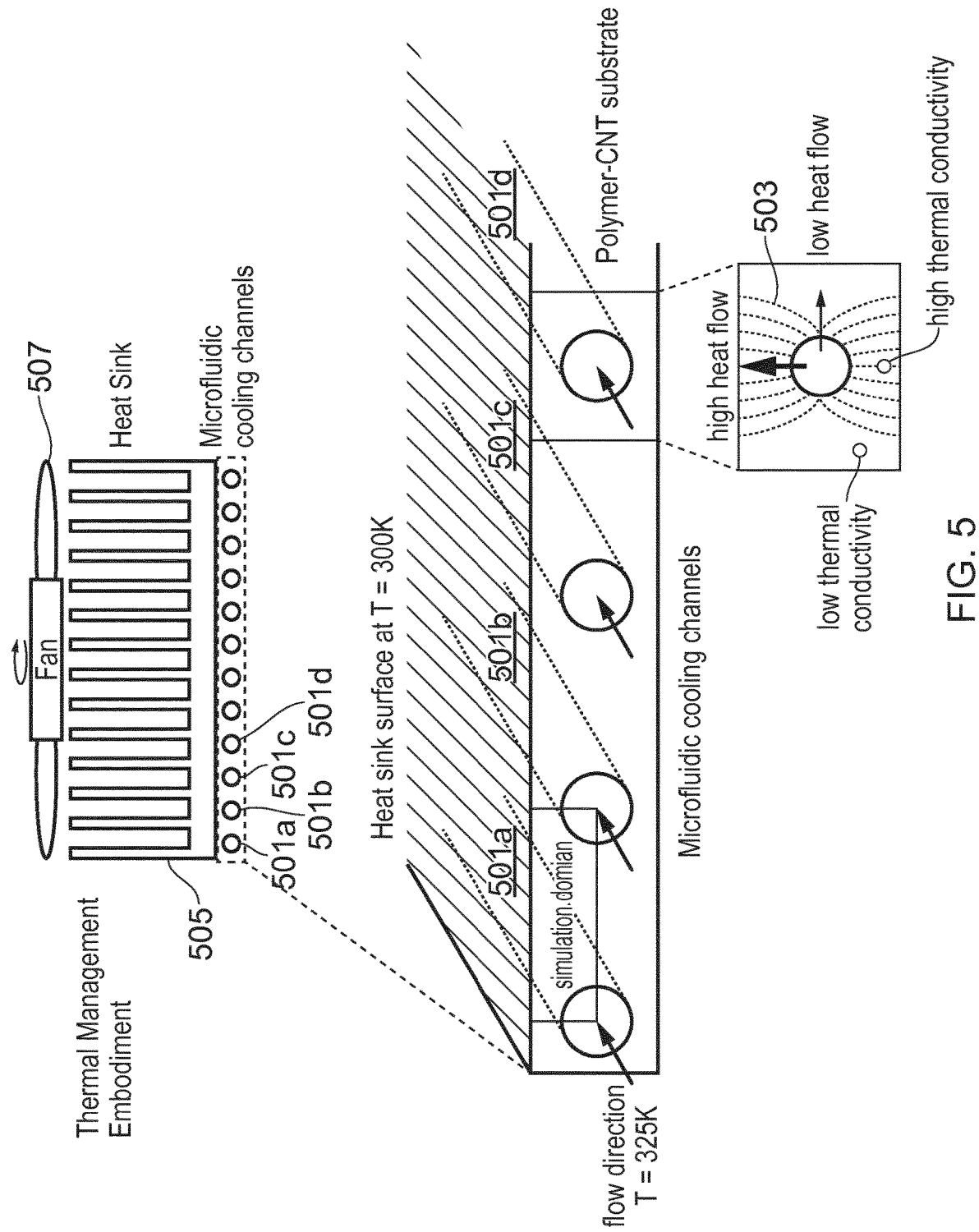
FIG. 5 is a schematic representation of an apparatus according to an example.

FIG. 5 is a schematic representation of an apparatus according to an example. The apparatus of FIG. 5 can be used to provide increased heat transfer to/from microfluidic cooling channels 501a-d. As the one-dimensional carbon material also has excellent thermal conductivity, and the electrical field lines are analogous to heat lines, heat is effectively moved in this anisotropic arrangement (without the need for high filler loadings). In the example of FIG. 5, different arrangements also demonstrate the various ways to control conductivity to prevent/enhance thermal cross-talk between channels. It could also be used to control individual phases/droplets with different permittivities from the carrier fluid.

As depicted in FIG. 5, the electrically and thermally conductive pathways 503 are configured to enable a high heat flow between the channels and the heat sink 505. A fan 507 may also be provided to augment the function of the heatsink 505 as is customary. Thus, a gas or liquid flowing through the channels can be cooled more efficiently.

Figure 6:
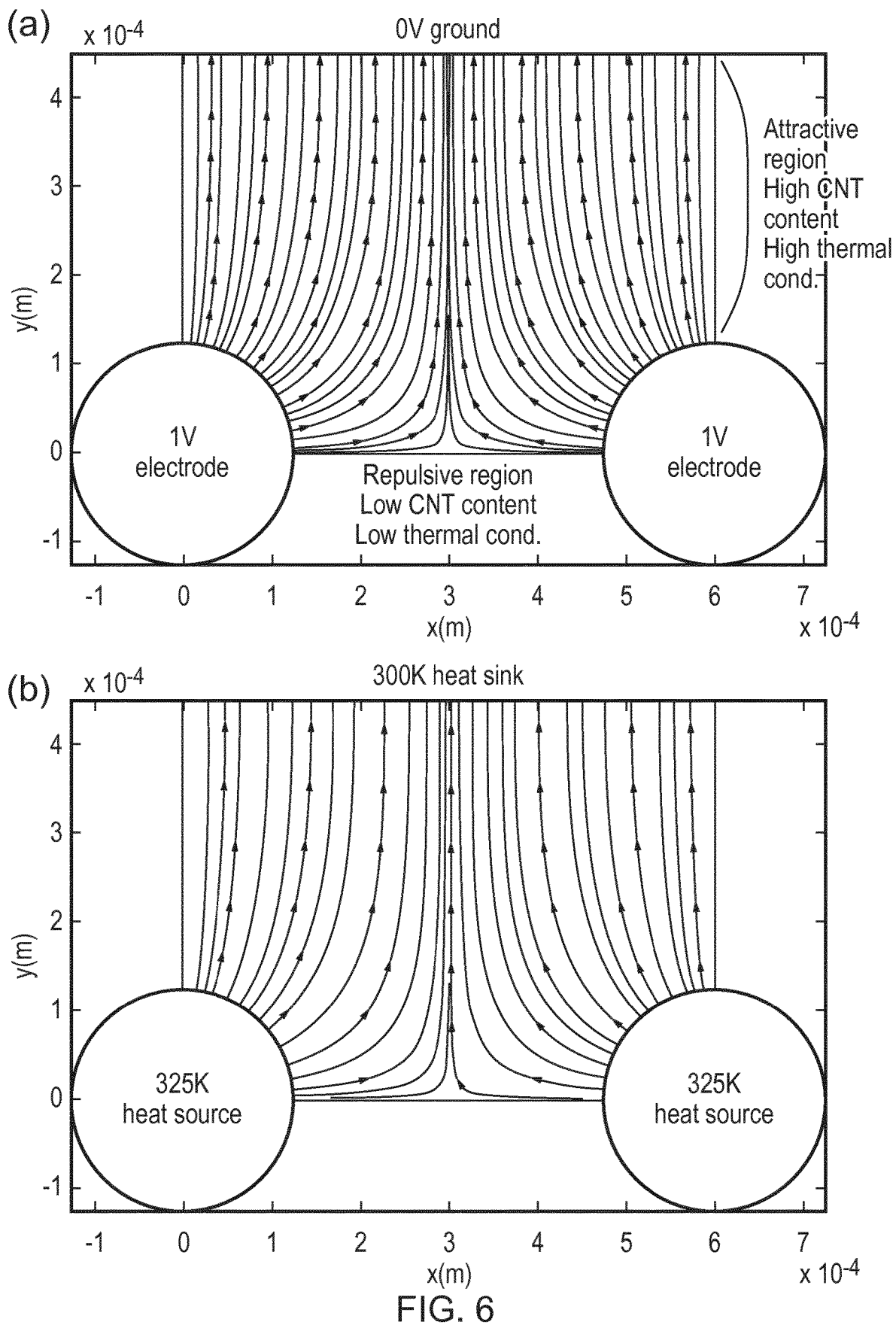
FIGS. 6a and 6b are schematic representations depicting the analogy between electric field lines and heat lines according to an example.

FIG. 6 is a schematic representation depicting the analogy between electric field lines (FIG. 6a) and heat lines (FIG. 6b). Accordingly, and with reference to FIG. 5, nanotube pathways defined for an apparatus as shown in FIG. 5 using an applied electric field as shown in FIG. 6a enable heat to be efficiently drawn from channels along the pathways depicted in FIG. 6b. That is, the nanotubes define pathways with relatively higher thermal conductivity along their length (generally, in a direction along the y-axis in FIG. 6b) compared to the thermal conductivity in an orthogonal direction (generally, in a direction along the x-axis in FIG. 6b).

Figure 7:
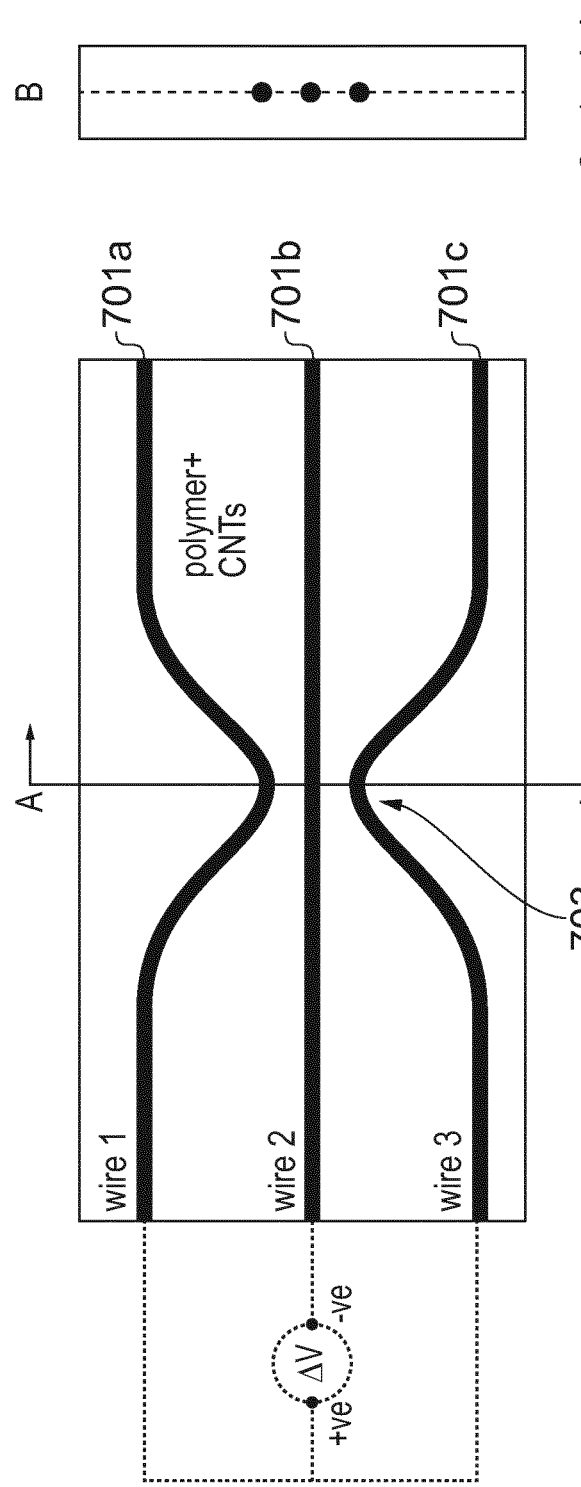
FIG. 7 is a schematic representation of an apparatus according to an example.

FIG. 7 is a schematic representation of an apparatus according to an example. In the example of FIG. 7, multiple electrodes 701a-c are provided. Electrodes 701a and 701c are provided on either side of and run generally parallel to and in the same plane B as the electrode 701b and are so profiled as to define a constriction or gate 703 through which the microfluidic channel passes whereby to provide a focussed conductive region.

The apparatus of FIG. 7 can be used to measure electrical resistance/capacitance across a microfluidic channel to determine fluid phase (pH/concentration/reaction kinetics) and velocity in a multiphase flow. In this connection, electrode 701b may be removed to provide a microfluidic channel passing through the constriction 703.

Figure 8:
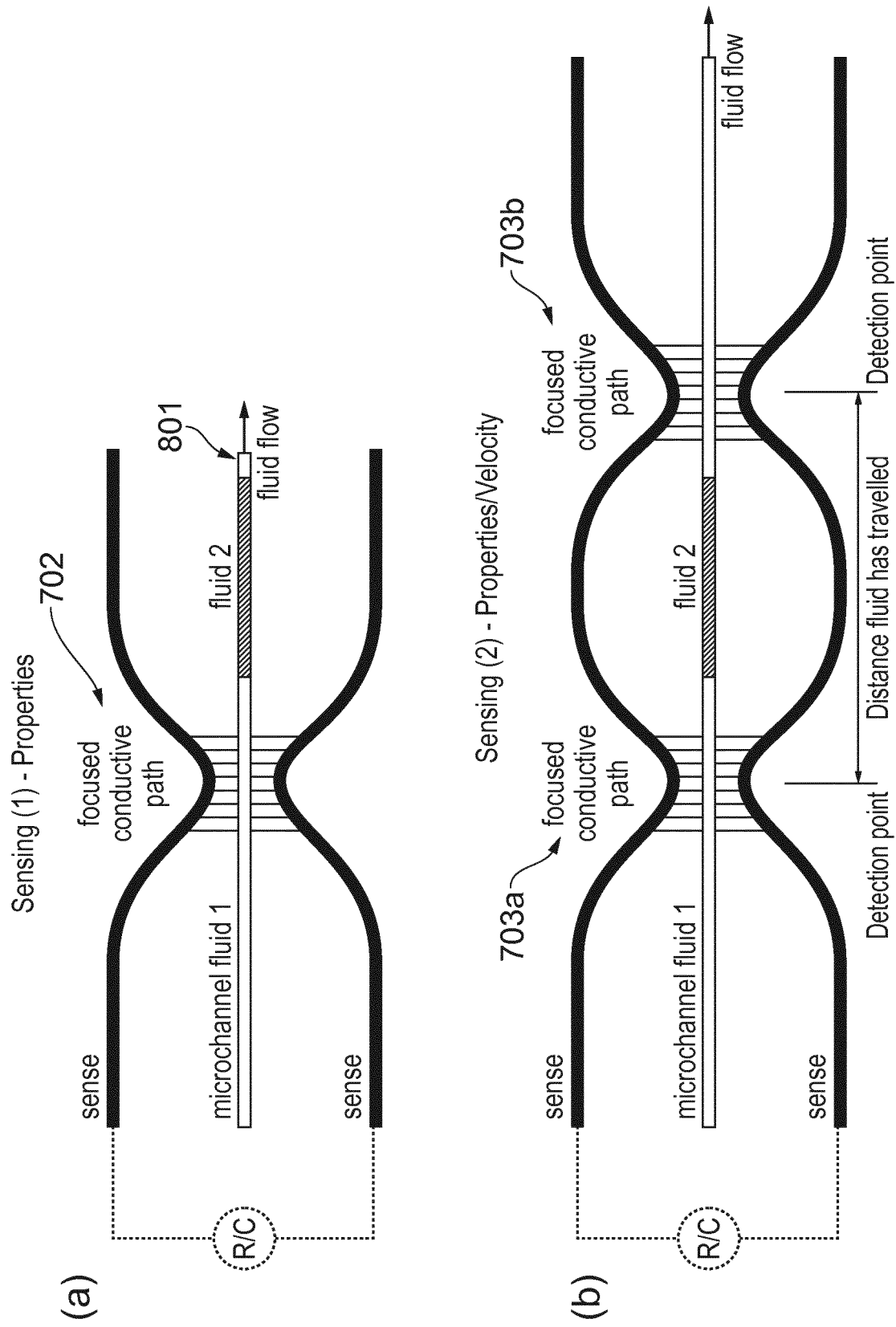
FIGS. 8a and 8b are schematic representations of apparatus according to an example.

FIG. 8 is a schematic representation of apparatus according to an example. More particularly, FIG. 8a depicts an apparatus derived from that shown in FIG. 7 (with electrode 701b removed to provide a channel) in which changes in electrical resistance (or capacitance) can be determined in, for example, water (fluid 2) and air flow (fluid 1) in the microchannel 801 using gate 702. These differences in resistance would be used to determine the phase composition, bubble/droplet length, and so on.

FIG. 8b depicts an apparatus derived from that shown in FIG. 7 (with electrode 701b removed to provide a channel) and including two constrictions or gates 703a, 703b in which changes in electrical resistance (or capacitance) can be used to determine phase velocity. That is, gates 703a and 703b define detection points with a known distance between them. The time taken for a sample to travel between the detection points can therefore be used to calculate velocity.

Figure 9:
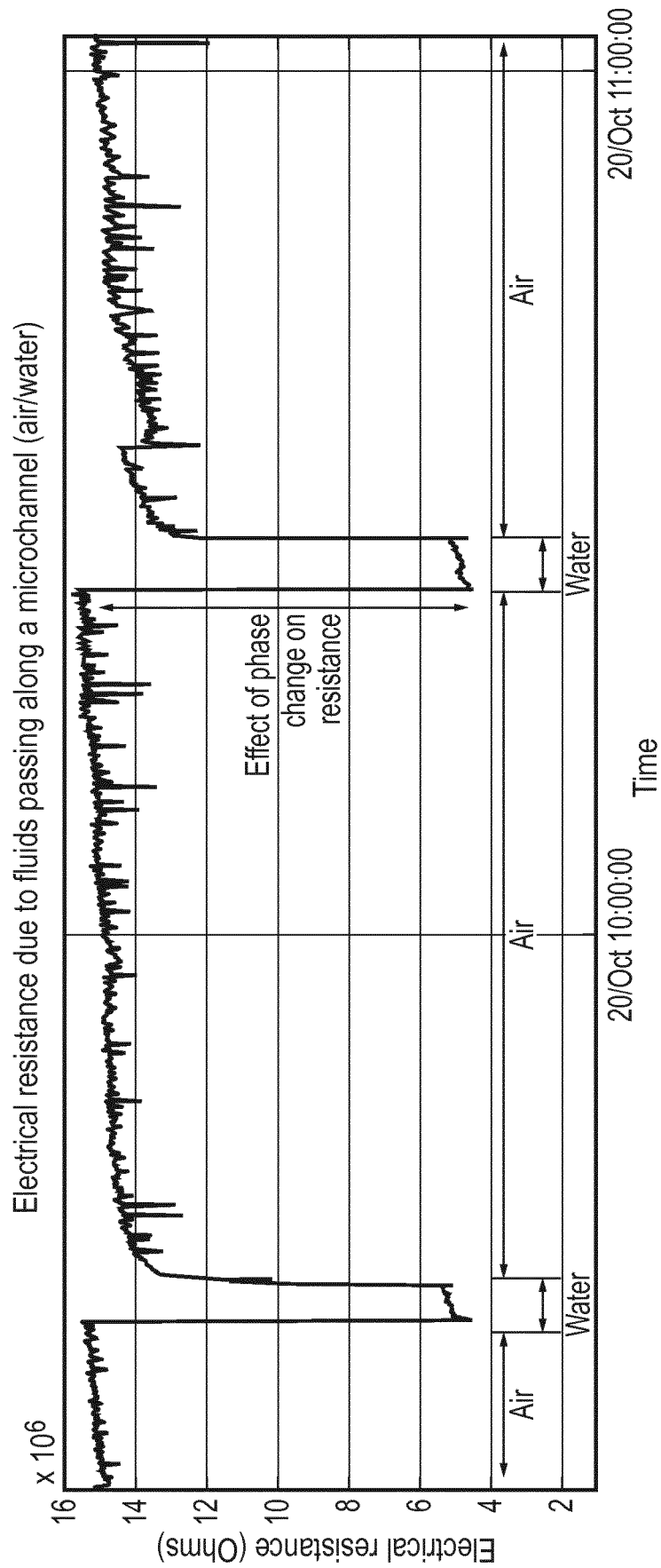
FIG. 9 is a schematic representation of the change in resistance measured using a gate as samples of fluid pass through the gate.

FIG. 9 is a schematic representation of the change in resistance measured using gate 702 in FIG. 8a as samples of fluid 2 pass through the gate. As can be seen, the change in resistance is marked (with fluid 2, water, presenting a lower resistance path than fluid 1, air).

Figure 10:
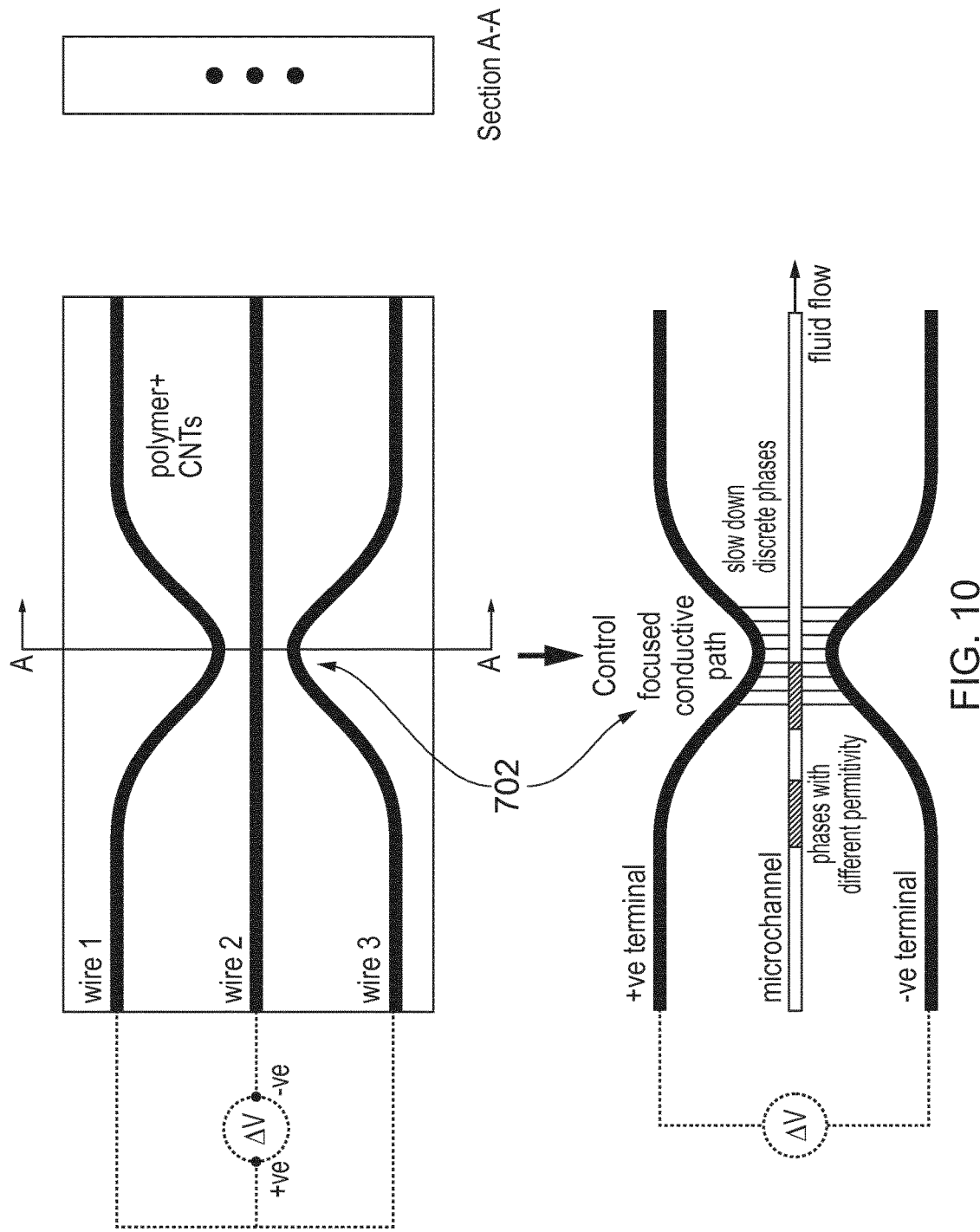
FIG. 10 is a schematic representation of an apparatus for merging samples according to an example.

The same device shown in FIG. 8a could also be used to control droplets (i.e. slow down or stop) for various digital microfluidic operations such as merging two or more droplets in a single stream. This is illustrated in FIG. 10. Here, the saw-tooth shaped wires forming constriction 702 are used as electrodes to apply a voltage difference across the channel. Phases with different permittivities react differently to the electrical field. Water droplets in a Tetradecane carrier for example can be slowed down as they pass through the gate allowing the droplet coming from behind to catch up and merge to form a single large droplet. This occurs due to the difference in relative permittivities (Water=80, Tetradecane=2). This capability would allow users to perform controlled reactions in a single channel through combining different chemicals contained within both individual droplets.

Thus, according to an example, functionalisation and creation of devices is done from a single (composite) material with very few fabrication steps. There is no requirement for specialised expensive equipment to construct devices from this fabrication approach. Bespoke, functional microfluidic devices can be constructed for ~$1 as opposed to the ~$1000's that is currently necessary. For thermal control, an advantage is an ability to provide targeted anisotropic paths for heat to flow along. Channels are also cured from a single polymer material, meaning there are no weak points in the channel structure due to bonding of dissimilar materials. This can result in a channel structure which can withstand higher pressure drops.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for fabricating an apparatus comprising at least one microfluidic channel within an anisotropic composite material structure comprising multiple electrically and thermally conductive pathways, the method comprising:
   providing an electrode within a composite material, the electrode positioned in a desired location for a microfluidic channel;
   applying an electric field across at least a portion of the composite material using the electrode whereby to define the pathways;
   curing the composite material whereby to fix the pathways in position in the composite material; and
   removing the electrode from the cured composite material to form the microfluidic channel.

2. A method as claimed in claim 1, further comprising:
   depositing the electrode in the desired location on a support structure; and depositing the composite material over the electrode.

3. A method as claimed in claim 2, further comprising:
   providing or otherwise depositing an upper layer over at least a portion of the composite material that has been deposited over the electrode.

4. A method as claimed in claim 3, wherein at least one of the support structure and upper layer include a conductive portion on a surface thereof, the method further comprising:
   applying the electric field across at least a portion of the composite material using the electrode and the conductive portion.

5. A method as claimed in claim 3, wherein the support structure and upper layer include respective conductive portions on a surface thereof, the method further comprising:
   applying the electric field across at least a portion of the composite material using the electrode and the conductive portions.

6. A method as claimed in claim 1, wherein the electrode is removed mechanically, by melting or by being dissolved.

7. A method as claimed in claim 6, wherein the electrode is mechanically removed after curing.

8. A method according to claim 7, wherein the electrode is a wire.

9. A method for fabricating an apparatus comprising at least one microfluidic channel within an anisotropic composite material structure comprising multiple electrically and thermally conductive pathways, the method comprising:
   providing an electrode within a composite material, the electrode positioned in a desired location for a microfluidic channel;
   applying an electric field across at least a portion of the composite material using the electrode whereby to define the pathways to form the at least one microfluidic channel; and
   curing the composite material whereby to fix the pathways in position in the composite material;
   depositing the electrode in the desired location on a support structure; and depositing the composite material over the electrode; and
   providing or otherwise depositing an upper layer over at least a portion of the composite material that has been deposited over the electrode;
   wherein at least one of the support structure and upper layer include a conductive portion on a surface thereof, the method further comprising:
   applying the electric field across at least a portion of the composite material using the electrode and the conductive portion.

10. A method as claimed in claim 9, wherein the support structure and upper layer include respective conductive portions on a surface thereof, the method further comprising:
    applying the electric field across at least a portion of the composite material using the electrode and the conductive portions.

* * * * *